US009008866B2

(12) United States Patent
Feau

(10) Patent No.: US 9,008,866 B2
(45) Date of Patent: Apr. 14, 2015

(54) ELECTRONIC CIRCUIT FOR DETERMINING AN ITEM OF DATA REPRESENTING A PARAMETER OF THE AIR AND SYSTEM COMPRISING SUCH A CIRCUIT

(75) Inventor: Julien Feau, Toulouse (FR)

(73) Assignee: Airbus Operations S.A.S., Toulouse (FR)

( * ) Notice: Subject to any disclaimer, the term of this patent is extended or adjusted under 35 U.S.C. 154(b) by 504 days.

(21) Appl. No.: 13/145,966

(22) PCT Filed: Jan. 21, 2010

(86) PCT No.: PCT/FR2010/000056
§ 371 (c)(1),
(2), (4) Date: Jul. 22, 2011

(87) PCT Pub. No.: WO2010/086526
PCT Pub. Date: Aug. 5, 2010

(65) Prior Publication Data
US 2011/0282560 A1 Nov. 17, 2011

(30) Foreign Application Priority Data
Jan. 28, 2009 (FR) ...................................... 09 50532

(51) Int. Cl.
*B64C 19/00* (2006.01)
*G01P 13/02* (2006.01)
(52) U.S. Cl.
CPC ............... *G01P 13/025* (2013.01); *B64C 19/00* (2013.01)
(58) Field of Classification Search
USPC .......................................................... 701/99
See application file for complete search history.

(56) References Cited

U.S. PATENT DOCUMENTS

| 4,785,403 | A * | 11/1988 | Kuhlberg | 701/14 |
|---|---|---|---|---|
| 5,001,638 | A * | 3/1991 | Zimmerman et al. | 701/14 |
| 7,188,008 | B2 * | 3/2007 | Garnaud et al. | 701/7 |
| 2004/0035113 | A1* | 2/2004 | Hanada et al. | 60/698 |
| 2005/0174073 | A1* | 8/2005 | Garnaud et al. | 318/42 |
| 2005/0197750 | A1* | 9/2005 | MacDougall | 701/3 |

(Continued)

FOREIGN PATENT DOCUMENTS

| CN | 88102523 | 11/1988 |
|---|---|---|
| CN | 1550988 | 12/2004 |

(Continued)

OTHER PUBLICATIONS

Calia, A., et al. "Air Data Failure Management in a Full-Authority Fly-By-Wire Control System." Proceedings of the 2006 IEEE: International Conference on Control Applications. XP 031011672. pp. 3277-3281 (Oct. 1, 2006).

(Continued)

*Primary Examiner* — Shelley Chen
(74) *Attorney, Agent, or Firm* — Oblon, McClelland, Maier & Neustadt, L.L.P.

(57) ABSTRACT

An electronic circuit, and a system including such a circuit, for determining a datum representative of a parameter of air surrounding an aircraft, including: a mechanism receiving, from a plurality of sources, a plurality of respective measurement data representative of a measured value of the parameter; a mechanism determining the datum representative of the parameter based on the measurement data; and a mechanism transmitting the datum representative of the parameter to a computer associated with an aircraft engine.

14 Claims, 4 Drawing Sheets

(56) References Cited

U.S. PATENT DOCUMENTS

2008/0288130 A1 11/2008 Feau
2011/0282822 A1 11/2011 Feau

FOREIGN PATENT DOCUMENTS

| | | |
|---|---|---|
| CN | 1646366 | 7/2005 |
| EP | 0 393 730 | 10/1990 |
| FR | 2 850 356 | 7/2004 |
| FR | 2 916 290 | 11/2008 |

OTHER PUBLICATIONS

International Search Report issued Apr. 6, 2010 in PCT/FR10/00056 Jan. 21, 2010.
English translation of Office Action dated Nov. 5, 2012, issued in counterpart Chinese Application No. 201080005680.6.
English translation of Office Action dated Jun. 9, 2013, issued in counterpart Chinese Application No. 201080005680.6.
English translation of Office Action dated Oct. 23, 2013, issued in counterpart Chinese Application No. 201080005680.6.
Preliminary Search Report for FR 0950532 issued Oct. 29, 2009.
International Preliminary Report on Patentability (including Written Opinion) for PCT/FR2010/000056 dated Aug. 2, 2011, provided in EP 2382515 on Aug. 16, 2011.
International Search Report for PCT/FR2010/000056 dated Apr. 6, 2010, provided in EP 2382515 on Aug. 5, 2010 (with English translation).
International Preliminary Report on Patentability (including Written Opinion) for PCT/FR2010/000056 dated Aug. 2, 2011 (with English translation of the Written Opinion).
International Search Report for PCT/FR2010/000056 dated Apr. 6, 2010 (with English translation).

* cited by examiner

ELECTRONIC CIRCUIT FOR DETERMINING AN ITEM OF DATA REPRESENTING A PARAMETER OF THE AIR AND SYSTEM COMPRISING SUCH A CIRCUIT

The invention relates to an electronic circuit for determining a datum representative of a parameter of the air surrounding an aircraft and a system comprising such a circuit.

It is known to take into account the data originating from a plurality of redundant sources for measuring an air parameter (such as, for example, the total pressure, the static pressure or the temperature) and to select from among these data the one that finally will be used, for example in a computer for controlling an engine (in this case generally for the purpose of determining parameters such as standard altitude, the Mach number and the difference between the actual temperature and the standard temperature).

Systems performing these operations are described, for example, in the patent applications FR 2 850 356 and FR 2 916 290.

In these systems, the robustness of the selection logic is improved by virtue of the considerable number of comparisons among sources. Moreover, in order to abide by the constraint of insulation of the engines even though these systems always provided for selection of the datum to be used in the engine control computers, the end result was a relatively complex design involving either the exchange of precision information items (each relating to a datum originating from a source of the fuselage), or the exchange of comparison results.

This invention thus is intended to simplify the design of the system, while making it possible to maintain a good robustness and to be able to abide by the constraint of insulation of the engines.

For this purpose in particular, the invention proposes an electronic circuit for determining a datum representative of a parameter of the air surrounding an aircraft, characterized in that it comprises:
  means for receiving, coming from a plurality of sources, a respective plurality of measurement data representative of a measured value of the parameter;

For this purpose in particular, the invention proposes an electronic circuit for determining a datum representative of a parameter of the air surrounding an aircraft, characterized in that it comprises:
  means for receiving, coming from a plurality of sources, a respective plurality of measurement data representative of a measured value of the parameter;
  means for determining the said datum representative of the parameter according to measurement data;
  means for transmitting the datum representative of the parameter to a computer associated with an engine of the aircraft.

The use of such a circuit makes it possible to exchange only the data representative of the parameter (which simplifies the design) while ensuring a substantial robustness by virtue of the comparisons made by means of the data received from the different sources.

The simplicity of this solution facilitates understanding of the functioning by the various participants and in this way makes it possible to avoid harmful errors.

The means for determining comprise, for example, means for comparing measurement data and means for selecting the datum representative of the parameter from among the measurement data.

It then may be provided for the comparing means and the selecting means to be capable of determining, for certain data at least among the plurality of measurement data, the number of other measurement data in agreement and choosing the datum representative of the parameter from among the data for which the number of other data in agreement is maximum.

This selection logic combines robustness as well as simplicity.

The said certain data are, for example, the data received coming from sources associated with a fuselage of the aircraft so as to be able, most of the time, to select the same source for the different engines (which is not possible with the sources of the engines because of the constraint of insulation of the engines).

The transmitting means typically are capable of transmitting the datum representative of the parameter (intended for the engine control computer) over a communication bus of the aircraft.

According to the design adopted, the invention proposes a system for determining a datum representative of a parameter of the air surrounding an aircraft, characterized in that it comprises:
  a plurality of sources each capable of transmitting a measurement datum representative of a measured value of the parameter;
  an electronic determining circuit capable of receiving the measurement data transmitted by the plurality of sources, determining the datum representative of the parameter according to the measurement data received and transmitting the datum representative of the parameter;
  a control computer associated with an engine of the aircraft and capable of receiving the transmitted datum and controlling the engine according to the transmitted datum.

According to a first embodiment, each source of the plurality of sources (for example at least three in practice) is located at a fuselage of the aircraft, which makes it possible to avoid placing sources at the engines.

According to a second embodiment, at least one source among the plurality of sources is located at the engine. This source thus may be used in the event of a problem during determination of the selected datum.

It may be provided in this context for another source among the plurality of sources to be located at another engine of the aircraft.

The determining system also may comprise:
  another electronic determining circuit capable of receiving the measurement data transmitted by the plurality of sources, selecting a datum from among the measurement data received and transmitting the selected datum;
  another control computer associated with another engine of the aircraft, and capable of receiving the datum transmitted by the other electronic circuit and controlling the other engine according to the received datum.

In this way the principle of insulation of the engines is observed.

The invention also proposes an aircraft comprising such a system.

Other characteristics and advantages of the invention will become more apparent on reading of the description that follows, presented with reference to the attached drawings in which:

FIG. 1 shows the main components of a system for processing air data in an aircraft. Such a system allows in particular the selection of a datum representative of an air parameter from among a plurality of data originating from redundant sources with a view to using the selected datum, for example in the context of control of an engine.

Figure 1:
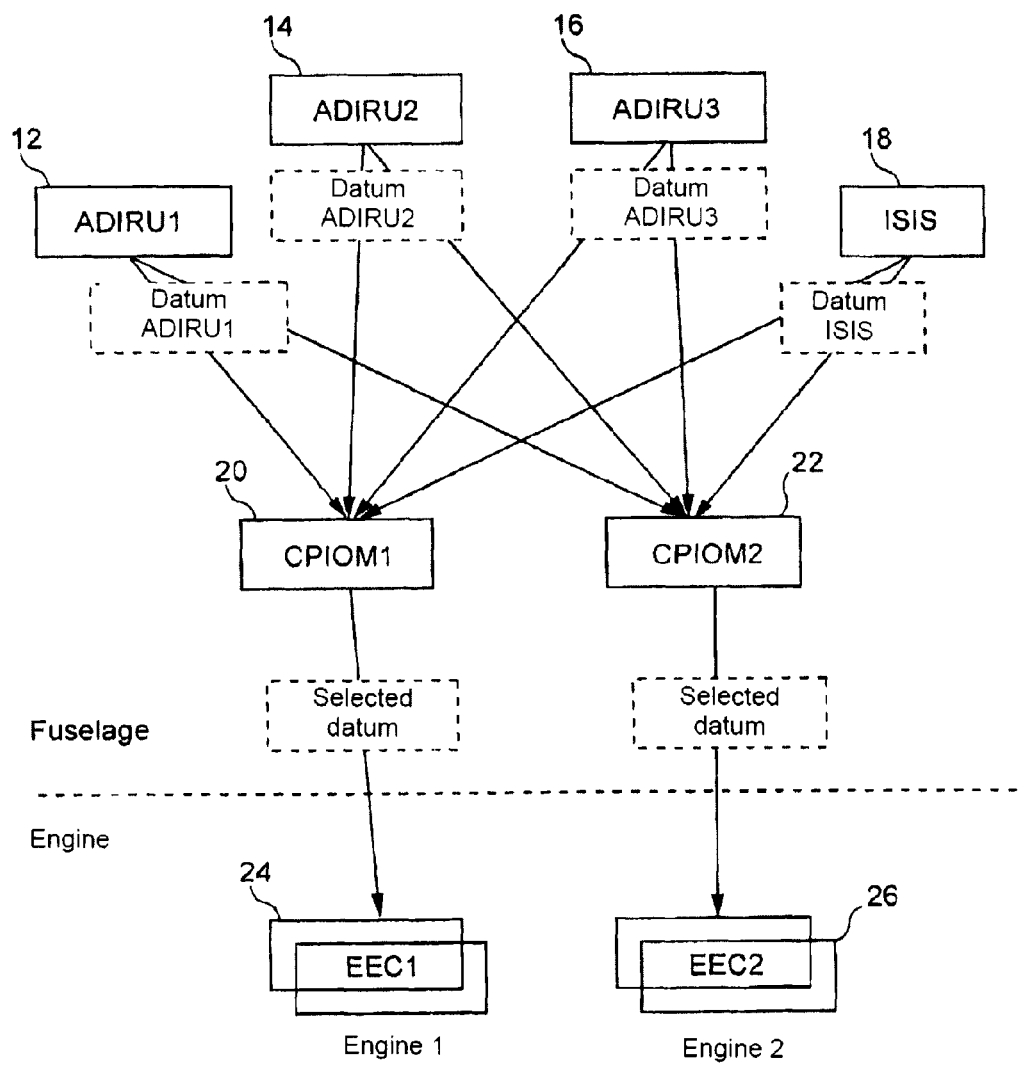
FIG. 1 shows a system for processing air data according to a first exemplary implementation of the invention.

This system comprises first of all a plurality of computers located at the fuselage of the aircraft:

three computers 12, 14, 16 associated with sources located on the fuselage, generally designated as ADIRU (for "Air Data and Inertial Reference Unit");

a computer 18 of ISIS (for "Integrated Standby Instrument System") type, which processes a standby source of air data;

generic computers 20, 22, for example of the CPIOM (for "Core Processing Input/Output Module") type, which here allow in particular the selection of a datum from among those received from the aforementioned computers as described in detail in the following.

Considered here as fuselage of the aircraft are all the parts of the aircraft with the exception of the engine or engines, whether it concerns engines borne by the wings or an engine located at the tail of the aircraft.

Because of their respective function in the context of this description, there shall be designated as "selection computers" 20, 22 the computers of CPIOM type and as "measurement computers" 12, 14, 16, 18 the computers of ADIRU and ISIS type, for that matter without its precluding these computers from being able to perform other functions in practice.

Each of the measurement computers ADIRU1, 12, ADIRU2 14, ADIRU3 16 and ISIS 18 determines a datum representative of the concerned air parameter (for example the total pressure) according to a measurement made by a sensor associated with the computer and located at the fuselage of the aircraft.

In this way these different measurement computers form redundant and independent sources of data representative of the concerned parameter.

Each selection computer 20, 22 receives different data transmitted independently by each measurement computer 12, 14, 16, 18 and undertakes selection of a datum from among same according to the logic explained in detail below.

The selected datum then is transmitted to a control computer 24, 26 associated with an engine and located there.

In the example shown on FIG. 1, selection computer CPIOM1 20 is associated with control computer EEC1 24, while selection computer CPIOM2 22 is associated (that is to say transmits the selected datum to) control computer EEC2 26.

It is seen that the data exchanges indicated above (both between the measurement computers and the concerned selection computer and between the selection computer and the engine control computer) are implemented by virtue of the data exchange bus usually connecting the computers with each other in an aircraft.

The logic for implementing the selection carried out in each selection computer of CPIOM type 20, 22 now is described with reference to FIG. 2.

Figure 2:
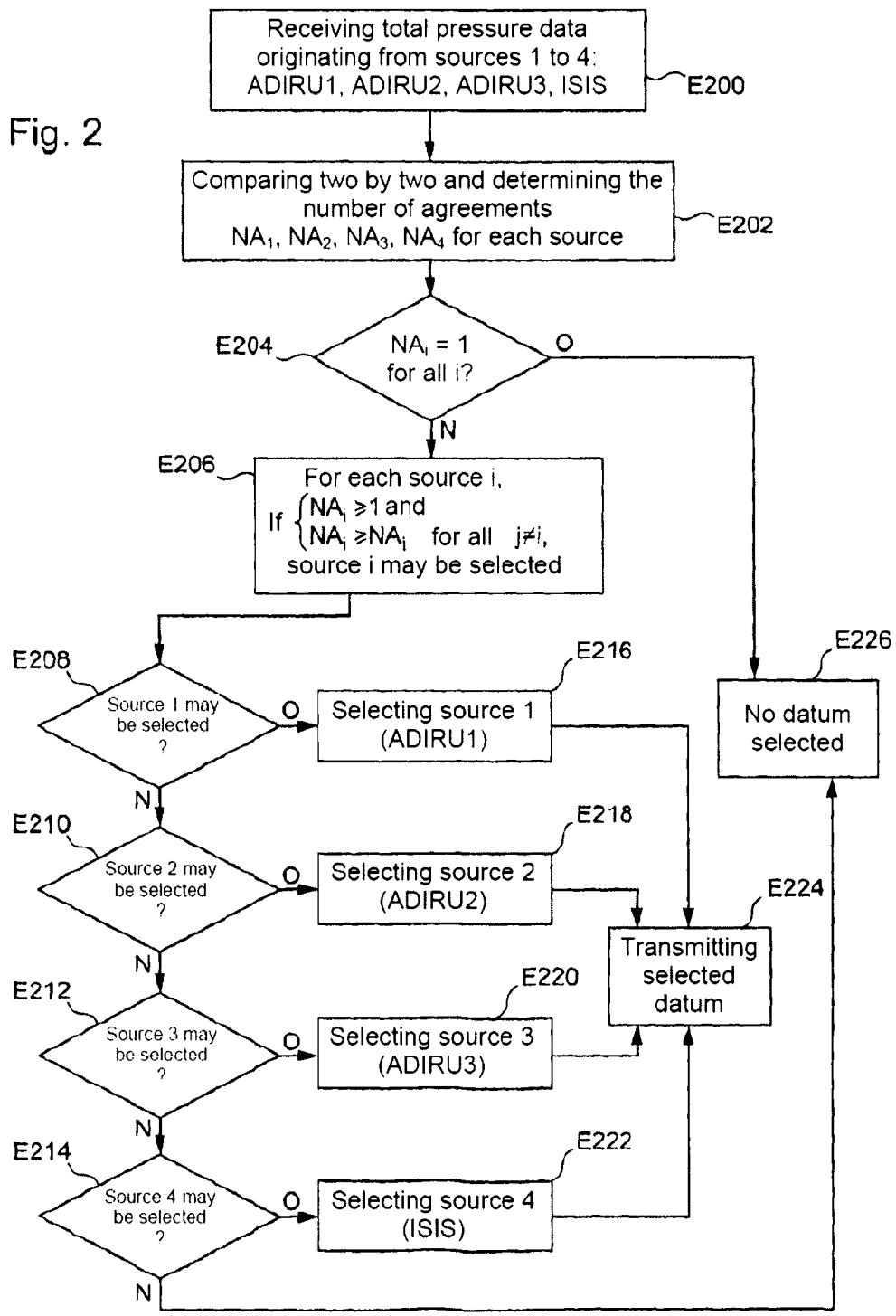
FIG. 2 shows the logic for selecting the data in the system of FIG. 1.

FIG. 2 thus shows the main steps of the functioning of a selection computer 20, 22 with regard to processing and selection from among data representative of the total pressure. Processing of other parameters concerned (for example static pressure and temperature) may be carried out according to an identical logic.

The processing method begins at step E200 with the reception of data representative of the total pressure coming from measurement computers 12, 14, 16, 18 each associated with a source: ADIRU1, ADIRU2, ADIRU3, ISIS, designated respectively as sources 1 to 4 below.

The selection computer concerned then performs at step E202 the two-by-two comparison of the data received and in this way is able to determine, for each source i, the number of other sources in agreement $NA_i$, two sources being in agreement if their data are valid and differ by a value less than (in absolute value) a threshold, for example of 38 mb for the total pressure.

It then is verified at step E204 that the case is not such that all the numbers of agreements $NA_i$ are equal to 1 (which occurs when the sources are in agreement by pairs but in disagreement from one pair to the other).

If all the numbers of agreements $NA_i$ are equal to one, it is considered that a value cannot be selected satisfactorily (since nothing makes it possible to favor one pair in relation to the other) and one goes on to step E226 which corresponds to an absence of possible selection (described farther on).

If there is at least one source i for which the number of agreements $NA_i$ is other than 1 (negative response to step E204), step E206 is undertaken, during which each source is successively taken into consideration: if the number of agreements $NA_i$ for the source considered is on the one hand greater than or equal to 1 and on the other hand greater than or equal to the numbers of agreements $NA_j$ of all the other sources, it is considered that source i may be selected.

That amounts to saying that all the sources that reach a non-zero and maximum number of agreements among the four sources may be selected.

When this processing is performed, one goes on to step E208 at which it is determined whether source 1 (corresponding to computer 12 ADIRU1) may be selected, in which case source 1 is selected (step E216).

If not at step E208, it is determined at step E210 whether source 2 may be selected, in which case source 2 (associated with computer 14 ADIRU2) is selected at step 218).

If the response is negative at step 210, it is determined at step E212 whether source 3 may be selected, in which case source 3 (corresponding to computer 16 ADIRU3) is selected at step E220.

If source 3 may not be selected at step E212, it is determined at step E214 whether source 4 (corresponding to measurement computer 18 ISIS) may be selected, in which case the datum originating from this computer 18 (source 4) is selected at step E222.

Irrespective of the datum selected (steps E216 to E222), this selected datum then is transmitted to control computer 24, 26 associated with the concerned selection computer 20, 22.

By using this solution for the different air parameters, each control computer 24, 26 thus may determine the control information items intended for the engine (in particular the information item on control of engine thrust) by means of parameters (such as the standard altitude, the Mach number and the difference between the actual temperature and the standard temperature) each obtained in a respective function table according to data representative of the air parameters (static pressure, total pressure and temperature) determined as indicated above.

On the other hand, if even source 4 may not be selected (in which case none of the sources is selected, which occurs when no agreement among sources has been detected), one goes on to step E226 relating to the absence of selection.

The processing performed at step E226 in the absence of data selection may consist, for example, in bringing back the last datum selected for a given period (for example 5 seconds), then transmitting a signal of invalidity of the datum once this period has elapsed (in which case control computer 24, 26 will receive this information item on invalidity of the datum and will go over to a default operating mode, that is to say without knowledge of the value of the parameter).

It is understood that the selection logic which has just been described makes it possible to select the datum originating from one of the sources which are in agreement with the greatest number of other sources, the choice among the different sources having reached this maximum number of agreements being set by convention, that is to say in a predetermined manner, so that selection computers 20, 22 in this case choose the same datum, which allows a symmetrical functioning of the engines whose control computers receive this datum.

Figure 3:
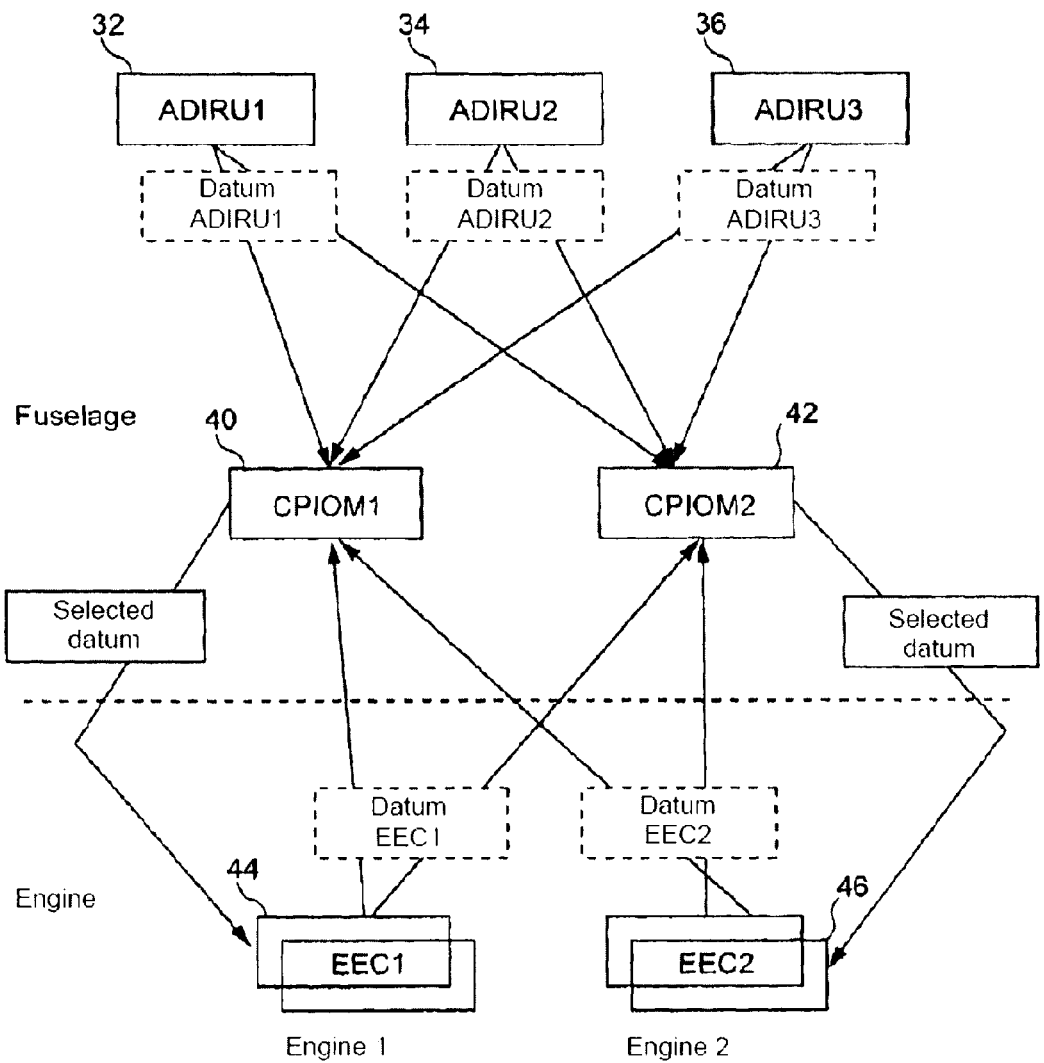
FIG. 3 shows a system for processing air data according to a second exemplary implementation of the invention.

FIG. 3 shows the main components of a processing system for data representative of the air parameters according to a second embodiment.

In this second embodiment, three measurement computers ADIRU1, ADIRU2, ADIRU3 (respectively referenced subsequently as 32, 34, 36) each determine the data representative of a value of each of the measured parameters (static pressure, total pressure, temperature) on the basis of measurements performed by sensors associated with the fuselage of the aircraft.

In this way, the three measurement computers 32, 34, 36 constitute redundant and independent sources of air data.

In this embodiment, engine control computers 44, 46, each associated with a separate engine of the aircraft, also each deliver data representative of the air parameters determined by means of sensors associated with (that is to say here located on the) concerned engine.

The system shown on FIG. 3 further comprises two selection computers 40, 42, here located at the fuselage of the aircraft, and which each receive data representative of each air parameter from the five sources mentioned above, namely the three measurement computers 32, 34, 36 and the two control computers 44, 46.

The data are, for example, exchanged among the computers by means of an avionic bus with which the aircraft is equipped.

It is further recalled that the terminology "measurement computer," "selection computer," for the concerned computers relate to the function implemented in the context of this description, nonetheless without precluding these computers from being able to implement other functions in the aircraft.

Each selection computer 40, 42 selects (for each parameter) one of the five data received from the different computers on the basis of the selection logic described below and transmits (always for each parameter) the selected datum to control computer 44, 46 associated with the concerned selection computer 40, 42 (selection computer CPIOM1 40 being associated with control computer EEC1 44 and selection computer CPIOM2 42 being associated with control computer EEC2 46).

Each control computer 44, 46 thus receives for each parameter a selected datum representative of the value of this parameter and in this way is able to determine, with the aid of function tables for example, other parameters used for determining the control information items intended for the engine such as, for example, the standard altitude, the Mach number and the difference between the actual temperature and the standard temperature.

Figure 4:
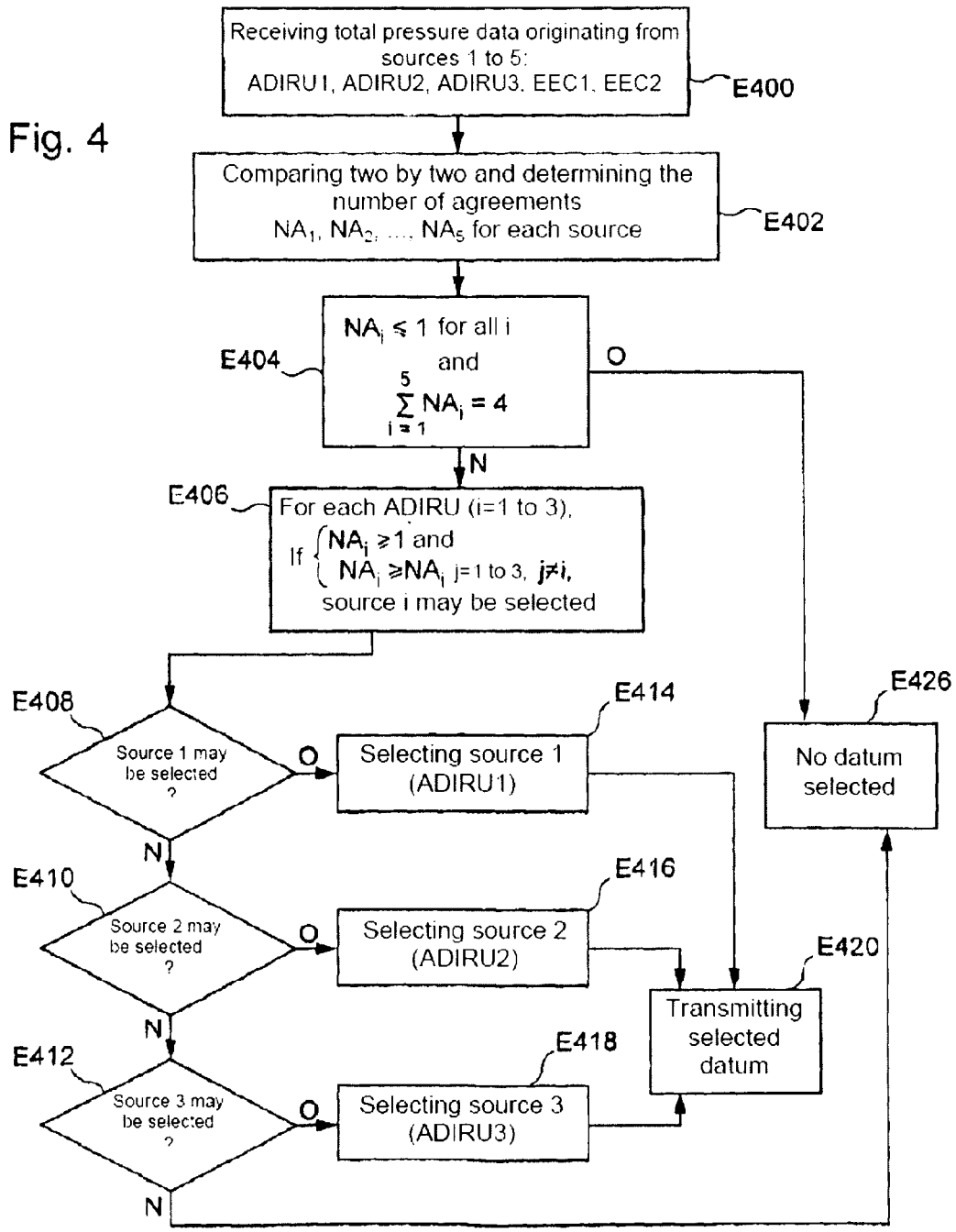
FIG. 4 shows logic for selecting data in the system of FIG. 3.

FIG. 4 shows the main steps for implementation of selection of a datum representative of an air parameter (here the temperature) such as performed in each of the two selection computers 40, 42.

As already indicated, the concerned selection computer 40, 42 receives data representative of the measured temperature values transmitted by each of the five independent sources (ADIRU1, ADIRU2, ADIRU3, EEC1, EEC2, respectively designated below as sources 1 to 5) at step E400.

At step E402, selection computer 40, 42 then undertakes two-by-two comparison of the received data and in this way determines for each source i the number $NA_i$ of other sources in agreement with the source i concerned (the values of the $NA_i$s therefore varying between 0 and 4). For example, it is considered that two temperature data are in agreement when they are valid and when the absolute value of their difference is less than 5 C.°.

At step E404 it then is determined whether all the values $NA_i$ are equal either to 0, or to 1 and whether the sum of all the values $NA_i$ amounts to 4 (which would mean that two pairs of sources are in agreement only in each pair and that therefore no decision can be made as to a datum correctly assessing the value of the parameter).

In the case of a positive determination at step E404, one goes on to step E422 for processing cases of impossibility of selection of a source (explained in detail farther on).

In the case of a negative determination at step E404, one goes on to step E406 during which it is verified for each source corresponding to a measurement computer located at the fuselage (that is to say for each ADIRU, or for each source i with i ranging between 1 and 3) on the one hand whether the associated number of agreements $NA_i$ is greater than or equal to 1 and, on the other hand, whether this number of agreements is greater than or equal to the numbers of agreements $NA_j$ obtained by the other ADIRUs (that is to say when j takes on values other than i ranging between 1 and 3).

If the aforementioned condition is verified (that is to say when the number of agreements $NA_i$ of source i considered is the greatest number of non-zero agreements found among the ADIRUs), it is considered that source i may be selected.

When the determination which has just been explained is made for all the sources associated with the fuselage (ADIRU), one proceeds to step E408 at which it is verified whether it has been determined previously that source 1 (datum originating from measurement computer 32 ADIRU1) may be selected, in which case selection of source 1 (that is to say of the datum originating from measurement computer 32) is undertaken at step E414.

If source 1 may not be selected, one proceeds to step E410 at which it is verified whether source 2 may be selected: if so, source 2 (that is to say the datum transmitted by measurement computer 34, also called ADIRU2) is selected at step E416.

If it is determined at step E410 that source 2 may not be selected, it is verified at step E412 whether source 3 may be selected; if so, the datum corresponding to source 3 (that is to say the datum transmitted by measurement computer 36, also called ADIRU3) is selected at step E418.

If a datum has been selected (steps E414, E416 or E418), transmission of this selected datum to control computer 44, 46 associated with concerned selection computers 40, 42 is undertaken at step E420.

If on the other hand it has been determined at step E412 that even source 3 may not be selected, step E422 already mentioned is undertaken for processing of the case where it is impossible to select a datum.

It may be provided, for example, for the implementation of step E422 for the last temperature value to be brought back for a predetermined period (for example 5 seconds), at the end of which period selection computer 40, 42 will transmit to associated control computer 44, 46 an information item on invalidity of the selected datum previously transmitted.

The concerned control computer 44, 46 then will be able, for example, either to select the datum generated by its own source, or change over to default operating mode if its own source is unavailable.

The preceding embodiments are only possible examples of implementation of the invention.

The invention claimed is:

1. An electronic circuit for determining a datum representative of a parameter of air surrounding an aircraft, comprising:
    a first processor configured to
        receive, from a plurality of sources, respective measurement data representative of a measured value of the parameter of air surrounding the aircraft,
        determine the datum representative of the parameter of air surrounding the aircraft based on the measurement data from the plurality of sources, and
        transmit the determined datum representative of the parameter of air surrounding the aircraft only to a first computer associated with a first engine of the aircraft,
        wherein the first processor performs the determining of the datum representative of the parameter of air surrounding the aircraft by comparing the measurement data from the plurality of sources and by selecting the datum representative of the parameter of air surrounding the aircraft from among the measurement data from the plurality of sources, and
    a second processor, different from said first processor, configured to
        receive, from the plurality of sources, the respective measurement data representative of the measured value of the parameter of air surrounding the aircraft,
        determine the datum representative of the parameter of air surrounding the aircraft based on the measurement data from the plurality of sources, and
        transmit said determined datum representative of the parameter of air surrounding the aircraft only to a second computer, different from said first computer, associated with a second engine of the aircraft,
    wherein said determined datum representative of the parameter of air surrounding the aircraft transmitted to said first computer associated with said first engine is the same as said determined datum representative of the parameter of air surrounding the aircraft transmitted to said second computer associated with said second engine.

2. An electronic circuit according to claim 1, wherein each of said first and second processors is configured to determine, for certain data at least among the measurement data from the plurality of sources, a number of other measurement data in agreement, and to choose the datum representative of the parameter of air surrounding the aircraft from among the measurement data for which the number of other measurement data in agreement is maximum.

3. An electronic circuit according to claim 1, wherein each of said first and second processors is configured to transmit the datum representative of the parameter of air surrounding the aircraft over a corresponding communication bus of the aircraft.

4. A system for determining a datum representative of a parameter of air surrounding an aircraft, comprising:

a plurality of sources each configured to transmit a measurement datum representative of a measured value of the parameter of air surrounding the aircraft;
a first electronic circuit to receive the measurement data transmitted by the plurality of sources, to determine the datum representative of the parameter of air surrounding the aircraft based on the measurement data received from the plurality of sources, and to transmit the determined datum representative of the parameter of air surrounding the aircraft;
a first control computer associated with a first engine of the aircraft and configured to receive the transmitted datum and to control the first engine according to the transmitted datum,
wherein the first electronic circuit selects the datum representative of the parameter of air surrounding the aircraft from among the measurement data from the plurality of sources;
a second electronic circuit, different from said first electronic circuit, to receive the measurement data transmitted by the plurality of sources, to determine the datum representative of the parameter of air surrounding the aircraft based on the measurement data received from the plurality of sources, and to transmit the determined datum representative of the parameter of air surrounding the aircraft; and
a second control computer, different from said first control computer, associated with a second engine of the aircraft and configured to receive the transmitted datum and to control said second engine according to the transmitted datum,
wherein the determined datum representative of the parameter of air surrounding the aircraft transmitted to said first control computer associated with said first engine is the same as the determined datum representative of the parameter of air surrounding the aircraft transmitted to said second control computer associated with said second engine,
wherein the first electronic circuit transmits the determined datum only to the first control computer and not the second control computer, and
wherein the second electronic control circuit transmits the determined datum only to the second control computer and not the first control computer.

5. A system for determining according to claim 4, wherein each source of the plurality of sources is located at a fuselage of the aircraft.

6. A system for determining according to claim 4, wherein at least one source among the plurality of sources is located at said first engine of the aircraft and another source among the plurality of sources is located at said second engine of the aircraft.

7. An aircraft comprising a system according to claim 4.

8. An electronic circuit according to claim 1,
wherein said first processor transmits said determined datum representative of the parameter of air surrounding the aircraft to said first computer associated with said first engine of the aircraft without receiving engine measurement data from said first computer regarding said first engine, and
wherein said second processor transmits said determined datum representative of the parameter of air surrounding the aircraft to said second computer associated with said second engine of the aircraft without receiving engine measurement data from said second computer regarding said second engine.

9. An electronic circuit according to claim 1, wherein each of said first and second processors is configured to, in the absence of no datum selection representative of the parameter of air surrounding the aircraft, bring back a previously selected last datum for a given period, and to transmit a signal of invalidity of the datum once the given period has elapsed to the corresponding said first computer or said second computer to place the corresponding said first computer or said second computer in a default operating mode.

10. An electronic circuit according to claim 1,
wherein, when transmitting the determined datum representative of the parameter of air surrounding the aircraft to said first computer associated with said first engine of the aircraft, the transmitted datum is a selected datum from among the plurality of data, and said first processor transmits only the selected datum to said first computer associated with said first engine, and
wherein, when transmitting the determined datum representative of the parameter of air surrounding the aircraft to said second computer associated with said second engine of the aircraft, the transmitted datum is a selected datum from among the plurality of data, and said second processor transmits only the selected datum to said second computer associated with said second engine.

11. A system for determining according to claim 4,
wherein said first electronic circuit transmits the determined datum representative of the parameter of air surrounding the aircraft to said first control computer associated with said first engine of the aircraft without receiving engine measurement data from said first control computer regarding said first engine, and
wherein said second electronic circuit transmits the determined datum representative of the parameter of air surrounding the aircraft to said second control computer associated with said second engine of the aircraft without receiving engine measurement data from said second control computer regarding said second engine.

12. A system for determining according to claim 4, wherein each of said first electronic circuit and said second electronic circuit is configured to, in the absence of no datum selection representative of the parameter of air surrounding the aircraft, bring back a previously selected last datum for a given period, and transmit a signal of invalidity of the datum once the given period has elapsed to the corresponding said first control computer or said second control computer to place the corresponding said first control computer or said second control computer in a default operating mode.

13. A system for determining according to claim 4,
wherein, when transmitting the determined datum representative of the parameter of air surrounding the aircraft to said first control computer associated with said first engine of the aircraft, the transmitted datum is a selected datum from among the plurality of data, and said first electronic circuit transmits only the selected datum to said first control computer associated with said first engine, and
wherein, when transmitting the determined datum representative of the parameter of air surrounding the aircraft to said second control computer associated with said second engine of the aircraft, the transmitted datum is a selected datum from among the plurality of data, and said second electronic circuit transmits only the selected datum to said second control computer associated with said second engine.

14. A system for determining according to claim 4,
wherein said first electronic circuit receives engine measurement data regarding said first engine from said first control computer and engine measurement data regarding said second engine from said second control computer, and
wherein said second electronic circuit receives engine measurement data regarding said first engine from said first control computer and engine measurement data regarding said second engine from said second control computer.

* * * * *